United States Patent
Muramatsu et al.

(10) Patent No.: US 10,837,980 B2
(45) Date of Patent: Nov. 17, 2020

(54) ROTATION ANGLE DETECTION DEVICE FOR VEHICLE BRAKE

(71) Applicant: AISIN SEIKI KABUSHIKI KAISHA, Kariya (JP)

(72) Inventors: Hidenobu Muramatsu, Nagoya (JP); Takashi Hara, Ichinomiya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 120 days.

(21) Appl. No.: 16/135,112

(22) Filed: Sep. 19, 2018

(65) Prior Publication Data

US 2019/0107552 A1 Apr. 11, 2019

(30) Foreign Application Priority Data

Oct. 6, 2017 (JP) .................. 2017-196395

(51) Int. Cl.
*G01P 13/04* (2006.01)
*B60T 8/00* (2006.01)
(Continued)

(52) U.S. Cl.
CPC ............. *G01P 13/04* (2013.01); *B60T 1/10* (2013.01); *B60T 7/042* (2013.01); *B60T 8/00* (2013.01);
(Continued)

(58) Field of Classification Search
CPC ... G01P 13/04; B60T 8/00; B60T 1/10; B60T 8/171; B60T 8/17; B60T 7/042; B60T 8/321; B60T 2270/82; B60T 2220/04; B60T 2270/60; F16D 61/00; G01D 5/145; G01D 11/245; G01D 3/08; B60Q 1/44; G01L 35/0025; G01B 7/30
See application file for complete search history.

(56) References Cited

U.S. PATENT DOCUMENTS 7,916,489 B2  3/2011  Okuya
7,932,796 B2  4/2011  Yamada et al.
(Continued)

FOREIGN PATENT DOCUMENTS

JP  2008-124062  5/2008
JP  2009-087904  4/2009
(Continued)

*Primary Examiner* — Akm Zakaria
(74) *Attorney, Agent, or Firm* — Oblon, McClelland, Maier & Neustadt, L.L.P.

(57) ABSTRACT

A rotation angle detection device for a vehicle brake includes: a housing accommodating a magnetic detection unit; a rotation member supported to be rotatable relative to the housing; and a magnet held by the rotation member and rotating integrally with the rotation member, in which the magnetic detection unit includes a stroke detection unit and a switch detection unit, the stroke detection unit detects a rotation angle by which the rotation member has rotated from a reference position based on a magnetic force of the magnet, the switch detection unit detects that the rotation member has rotated from the reference position by a predetermined angle or more, and at least a portion of the stroke detection unit is disposed at a position where the portion overlaps with the magnet in an axial direction of a rotational axis of the rotation member.

8 Claims, 11 Drawing Sheets

(51) Int. Cl.
  *B60T 1/10* (2006.01)
  *F16D 61/00* (2006.01)
  *B60T 8/171* (2006.01)
  *B60T 8/17* (2006.01)
  *B60T 7/04* (2006.01)
  *G01D 5/14* (2006.01)
  *G01D 11/24* (2006.01)
  *B60T 8/32* (2006.01)
  *G01D 3/08* (2006.01)
  *B60Q 1/44* (2006.01)

(52) U.S. Cl.
  CPC ............... *B60T 8/17* (2013.01); *B60T 8/171* (2013.01); *F16D 61/00* (2013.01); *G01D 5/145* (2013.01); *G01D 11/245* (2013.01); *B60Q 1/44* (2013.01); *B60T 8/321* (2013.01); *B60T 2220/04* (2013.01); *B60T 2270/60* (2013.01); *B60T 2270/82* (2013.01); *G01D 3/08* (2013.01)

(56) References Cited

U.S. PATENT DOCUMENTS

| | | |
|---|---|---|
| 8,502,656 B2 | 8/2013 | Lee et al. |
| 8,773,116 B2 | 7/2014 | Hirose et al. |
| 2012/0056617 A1* | 3/2012 | Hirose .................. B60Q 1/441 324/207.25 |
| 2015/0007713 A1* | 1/2015 | Aki ....................... G01M 13/00 91/1 |

FOREIGN PATENT DOCUMENTS

| | | |
|---|---|---|
| JP | 2012-056564 | 3/2012 |
| JP | 2012-073231 | 4/2012 |
| JP | 2015-133224 | 7/2015 |

\* cited by examiner

ROTATION ANGLE DETECTION DEVICE FOR VEHICLE BRAKE

CROSS REFERENCE TO RELATED APPLICATIONS

This application is based on and claims priority under 35 U.S.C. § 119 to Japanese Patent Application 2017-196395, filed on Oct. 6, 2017, the entire contents of which are incorporated herein by reference.

TECHNICAL FIELD

This disclosure relates to a rotation angle detection device for a vehicle brake.

BACKGROUND DISCUSSION

An electric vehicle such as a so-called EV or HV vehicle sometimes performs a regenerative brake control in order to recover the kinetic energy of the vehicle as an electric energy (regenerative current), at the time of a brake operation.

Thus, the brake control system in the electric vehicle requires equipment having a function of turning on a stop (brake) lamp and equipment having a function of detecting the amount of suction in a brake for performing the regenerative brake control.

The brake control system in the electric vehicle is equipped with, for example, a stop lamp switch (sensor) in order to implement the function of turning on the stop lamp. In addition, the brake control system in the electric vehicle is equipped with, for example, a brake stroke sensor in order to implement the function of detecting the amount of suction in the brake.

The stop lamp switch and the brake stroke sensor are integrally provided as a rotation angle detection device for a vehicle brake (e.g., JP2012-073231A (Reference 1)).

Such a rotation angle detection device for a vehicle brake, as a vehicle component, requires, for example, a low cost, a lightweight, and space saving of an assembly space. When the rotation angle detection device is equipped with both the stop lamp switch and the brake stroke sensor, it may cause an increase in the cost, an increase in weight, and an increase in the assembly space. Further, as the number of sensors increases, the number of terminals for wiring also increases, which is problematic.

Thus, a need exists for a rotation angle detection device which is not susceptible to the drawback mentioned above.

SUMMARY

A feature of a rotation angle detection device for a vehicle brake according to an aspect of this disclosure resides in that the rotation angle detection device includes a housing configured to accommodate a magnetic detection unit that detects a change in a magnetic force, a rotation member supported so as to be rotatable relative to the housing, and a magnet held by the rotation member and configured to rotate integrally with the rotation member, wherein the magnetic detection unit includes a stroke detection unit disposed on a substrate and a switch detection unit disposed on the substrate, the stroke detection unit detects a rotation angle by which the rotation member has rotated from a reference position based on a magnetic force of the magnet, the switch detection unit detects that the rotation member has rotated from the reference position by a predetermined angle or more, and at least a portion of the stroke detection unit is disposed at a position where the portion overlaps with the magnet when viewed in an axial direction of a rotational axis of the rotation member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A rotation angle detection device 1 for a vehicle brake according to an embodiment disclosed here will be described with reference to FIGS. 1 to 14.

First, a schematic configuration of the rotation angle detection device 1 will be described.

<Schematic Configuration>

Figure 1:
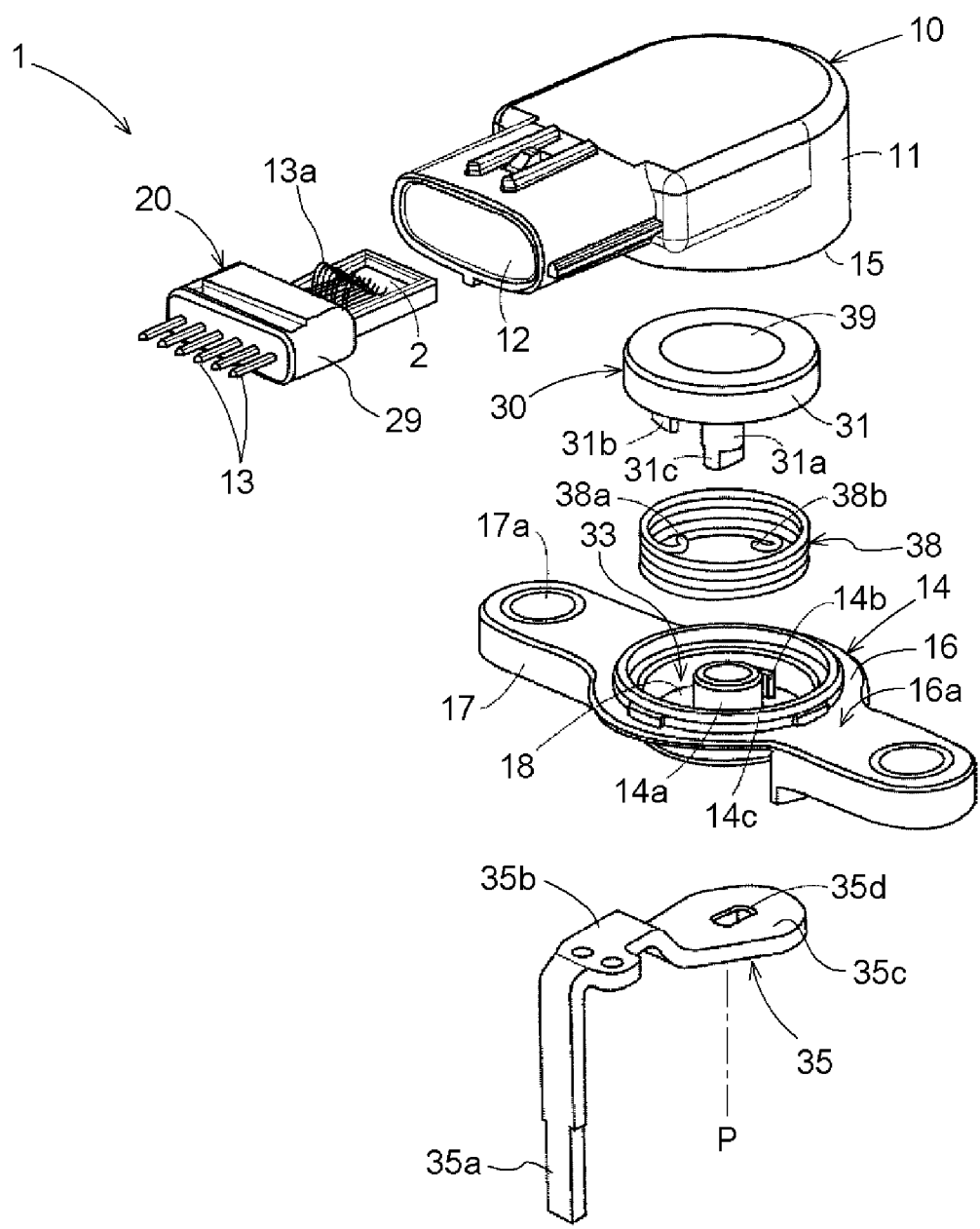
FIG. 1 is an exploded perspective view for explaining a schematic configuration of a rotation angle detection device.

As illustrated in FIG. 1, the rotation angle detection device 1 for a vehicle brake according to the present embodiment includes a housing 10 configured to accommodate a magnetic detection unit 2 that detects a change in magnetic force, a rotation member 30 supported to be rotatable relative to the housing 10, and a magnet 39 held by the rotation member 30 to rotate integrally with the rotation member 30.

Hereinafter, a configuration of the rotation angle detection device 1 will be described.

Detailed Description

As illustrated in FIGS. 7 to 14, the rotation angle detection device 1 is connected to an ECU 9 as an engine control unit of a vehicle, and forms a portion of a brake system of the vehicle.

As illustrated in FIG. 1, the rotation angle detection device 1 includes a magneto-sensitive unit 20 having the magnetic detection unit 2, the housing 10, the magnet 39, the rotation member 30, a support member 14, an elastic member 38, and an input member 35 as major components.

First, the components other than the magnetic detection unit 2 will be described.

The housing 10 accommodates the magneto-sensitive unit 20 having the magnetic detection unit 2.

The housing 10 includes a body portion 11, a terminal portion 12, and a cylindrical portion 15.

The housing 10 is integrally formed using a resin material.

The magneto-sensitive unit 20 includes the magnetic detection unit 2 and a lead terminal 13.

The magnetic detection unit 2 is connected to a plurality of lead terminals 13.

The lead terminal 13 may be formed as a lead frame which is formed of, for example, copper or a copper alloy. The magnetic detection unit 2 and the plurality of lead terminals 13 are integrated with each other by a molded element 29 formed of a resin, and are electrically connected to each other via a lead wire 13a. The lead wire 13a may be formed as a bonding wire which is formed of, for example, gold or copper.

An accommodating chamber (not illustrated) for the magneto-sensitive unit 20 is formed inside the body portion 11, and the magneto-sensitive unit 20 including the magnetic detection unit 2 is accommodated in the accommodating chamber.

The plurality of lead terminals 13 are disposed in a state of being exposed in the terminal portion 12.

The magneto-sensitive unit 20 and an external device (not illustrated) are electrically connected to each other through the terminal portion 12 and a connector (not illustrated) fitted thereto.

The cylindrical portion 15 protrudes from the body portion 11 toward the side of the rotation member 30 in a state of surrounding the arrangement position of the magnetic detection unit 2. A magnet accommodating chamber is formed inside the cylindrical portion 15 to accommodate the magnet 39 therein.

Figure 2:
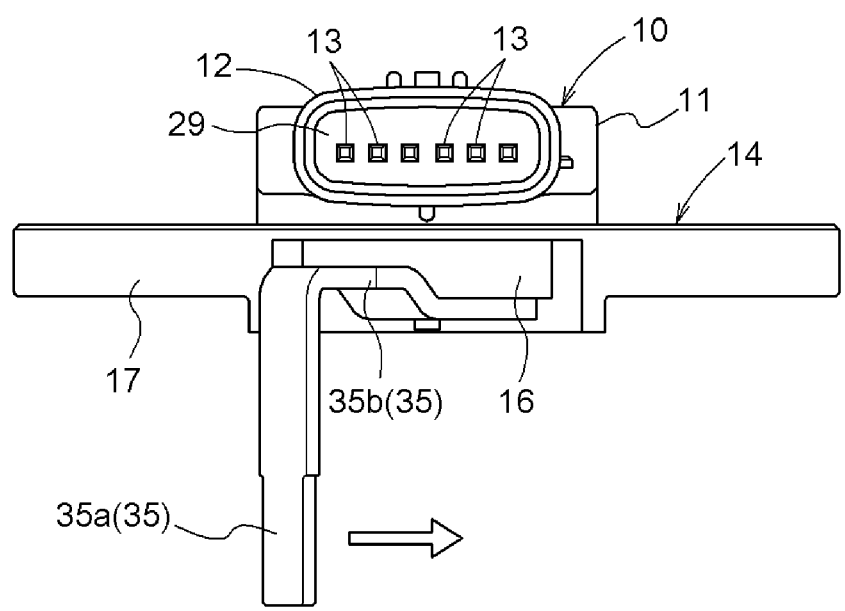
FIG. 2 is a side view of the rotation angle detection device.

The plurality of lead terminals 13 are disposed in a state of being exposed in the terminal portion 12 (see FIG. 2).

The lead terminals 13 are connected to the magnetic detection unit 2.

The magnetic detection unit 2 outputs a detection result to the outside (e.g., the ECU 9) through the lead terminals 13.

The magnet 39 is held by the rotation member 30.

The rotation member 30 includes a magnet holding portion 31 configured to hold the magnet 39 and a shaft portion 31a protruding from the magnet holding portion 31.

The rotation member 30 is integrally formed using a resin material. The magnet holding portion 31 is formed in a disk shape.

In the present embodiment, the magnet 39 is held in the magnet holding portion 31 in a state of being buried such that the surface thereof which faces the magnetic detection unit 2 is exposed. In the present embodiment, the magnet 39 is buried in a flat shape in the magnet holding portion 31.

The shaft portion 31a of the rotation member 30 is provided at the center position of the disk-shaped magnet holding portion 31.

The shaft portion 31a is disposed along a direction orthogonal to the extension plane of the magnetic detection unit 2.

The rotation member 30 is configured to hold the magnet 39 and to be rotatable about a rotational axis P along a direction in which the shaft portion 31a extends.

The tip end of the shaft portion 31a is formed with, for example, a width-across-flats engaging portion 31c. The engaging portion 31c is engaged with an engaging hole 35d formed in the input member 35.

An arcuate locking protrusion 31b is formed on the back surface of the magnet holding portion 31. A first end portion 38a of the elastic member 38 is locked by the locking protrusion 31b.

The rotation member 30 is supported via the support member 14 so as to be rotatable relative to the housing 10.

The support member 14 includes a support body portion 16 having a bearing portion 14a at the center portion thereof and a pair of flange portions 17 extending in opposite directions from the support body portion 16. The support member 14 is integrally formed using a resin material.

A mounting hole 17a is formed in each flange portion 17, and the rotation angle detection device 1 is attached to a mounted part (e.g., a vehicle body) by a fastening member such as, for example, a bolt inserted through the mounting hole 17a.

The bearing portion 14a is formed in a cylindrical shape through which the shaft portion 31a of the rotation member 30 may be inserted. The bearing portion 14a radially supports the rotation member 30 in a state where the inner peripheral surface thereof abuts on the outer peripheral surface of the shaft portion 31a.

The support body portion 16 includes a cylindrical portion 14c protruding from an upper surface 16a thereof.

The cylindrical portion 14c is fitted into the cylindrical portion 15 of the housing 10 (this fitting is, for example, internal fitting in the present embodiment). By the fitting, the magnet 39 is positioned relative to the magnetic detection unit 2. In addition, in this state, the housing 10 and the support member 14 are fixed to each other by, for example, laser welding.

The elastic member 38 is interposed between the support member 14 and the rotation member 30.

The elastic member 38 is a member having elasticity that urges the rotation member 30 from the housing 10 so as to return the position in the rotation direction of the rotation member 30 relative to the housing 10 to a reference position.

The present embodiment exemplifies a case where the elastic member 38 adopts a spring member as the member having elasticity. Specifically, the present embodiment illustrates a case where the elastic member 38 is a torsion coil spring as the spring member.

The elastic member 38 is disposed such that the rotation member 30 rotates against the urging force of the elastic member 38 when the rotation member 30 rotates based on a rotational force input to the input member 35.

The first end portion 38a of the elastic member 38 is locked by the locking protrusion 31b of the rotation member 30, and a second end portion 38b thereof is locked by a locking protrusion 14b of the support member 14.

The support body portion 16 has an annular recess 18 around the bearing portion 14a. The elastic member 38 is accommodated in the annular recess 18 (a spring accommodating chamber 33).

The arcuate locking protrusion 14b is formed on the bottom surface of the annular recess 18. The second end portion 38b of the elastic member 38 is locked by the locking protrusion 14b.

In a state where no external force acts on the rotation member 30, the elastic member 38 serves to return the position (phase) of the rotation member 30 in the rotation direction thereof to a predetermined reference position (hereinafter simply also referred to as a "reference position") in a state illustrated in FIG. 2. In addition, the reference position refers to a position at which the rotation angle of the rotation member 30 is zero.

Accordingly, the reference position for the rotation member 30 corresponds to a position in a state where no rotational force acts on the elastic member 38, and the rotation member 30 rotates against the urging force of the elastic member 38 according to the input of the rotational force.

The shaft portion 31a of the rotation member 30 is disposed in a state of penetrating the support member 14. The input member 35 is connected to the tip end (the engaging portion 31c) of the shaft portion 31a.

The input member 35 is an operation unit that inputs the rotational force which is a detection target of the rotation angle detection device 1. The input member 35 includes a connecting portion 35c connected to the shaft portion 31a, an arm portion 35b, and a lever portion 35a extending parallel to the shaft portion 31a at a different position from the shaft portion 31a.

The lever portion 35a, the arm portion 35b, and the connecting portion 35c are integrally formed.

In the input member 35 of the present embodiment, the arm portion 35b extends radially from the connecting portion 35c along a direction orthogonal to the rotational axis P of the shaft portion 31a by a predetermined length, and the lever portion 35a bends in a direction orthogonal to the direction in which the arm portion 35b extends so as to extend in a direction along the rotational axis P.

The connecting portion 35c is formed with, for example, the width-across-flats engaging hole 35d. The engaging portion 31c on the tip end of the shaft portion 31a is engaged in the engaging hole 35d.

In this way, the rotation member 30 and the input member 35 are connected to each other so as to be non-rotatable relative to each other.

In the present embodiment, a vehicle brake pedal (not illustrated) is engaged with the lever portion 35a, so that the rotational force is input from the lever portion 35a of the input member 35 to the rotation member 30 when a driver steps on the brake pedal.

When the rotational force is input from the lever portion 35a of the input member 35, the input member 35 moves from the reference position toward the right side in FIG. 2. Then, the rotation member 30 rotates along with the movement of the input member 35. That is, the magnet 39 rotates according to the rotational force input from the input member 35.

In the present embodiment, as described above, the magnet 39 and the rotation member 30 are integrally molded. However, at the time of the integral molding, the input member 35 may also be integrally molded.

When the rotation member 30 is viewed along the axial direction of the rotational axis P in a state where the input member 35 is connected to the rotation member 30, the input member 35 is formed to extend in a direction orthogonal to the axial direction, that is, in the radial direction.

As illustrated in FIGS. 3 to 6, the magnet 39 is disposed to face the magnetic detection unit 2.

The magnet 39 is disposed to face the magnetic detection unit 2 with a predetermined gap therebetween so that a magnetic flux caused by magnetic poles of the magnet 39 passes through the magnetic detection unit 2.

As illustrated in FIGS. 3 to 6, the magnet 39 is magnetized so that at least a pair of magnetic poles (an N pole and an S pole) appear on the upper and lower surfaces orthogonal to the axial direction of the rotational axis P and on the side surface orthogonal to the upper and lower surfaces. Accordingly, the magnetic poles on the surfaces of the magnet 39 which faces the magnetic detection unit 2 may change according to the rotational force input to the input member 35, which enables the rotation angle detection device 1 to detect the rotation angle.

FIGS. 3 to 6 illustrate a case where an end portion 39a side of the magnet 39 is an N pole and an end portion 39b side opposite to the end portion 39a is an S pole so that the respective sides are opposite magnetic poles.

The present embodiment illustrates a case where the magnet 39 is a permanent magnet. The magnet 39 may be an electromagnet.

In the case where the magnet 39 is a permanent magnet, the material of the magnet 39 is not particularly limited, and for example, a neodymium magnet, a samarium-cobalt magnet, an alnico magnet, or a ferrite magnet may be widely used. In addition, a method of manufacturing the magnet 39 is not particularly limited, and for example, a bond magnet (plastic magnet) or a sintered magnet may be widely used. An appropriate magnet for the magnet 39 may be selected in consideration of a relationship with the detection sensitivity of the magnetic detection unit 2.

The present embodiment describes a case where the magnet 39 is a neodymium magnet which is a permanent magnet.

<Description of Magnetic Detection Unit>

The magnetic detection unit 2 is a unit that detects a magnetic flux change in the magnetic force of the magnet 39 which changes according to the rotational force input to the input member 35.

As illustrated in FIGS. 3 to 6, the magnetic detection unit 2 includes a stroke detection unit 4 disposed on a substrate 5 and a switch detection unit 6 disposed on the substrate 5.

The stroke detection unit 4 detects the rotation angle of the rotation member 30 which has rotated from a predetermined reference position based on the magnetic force of the magnet 39.

The switch detection unit 6 detects that the rotation member 30 has rotated from the predetermined reference position by a predetermined angle or more.

Figure 3:
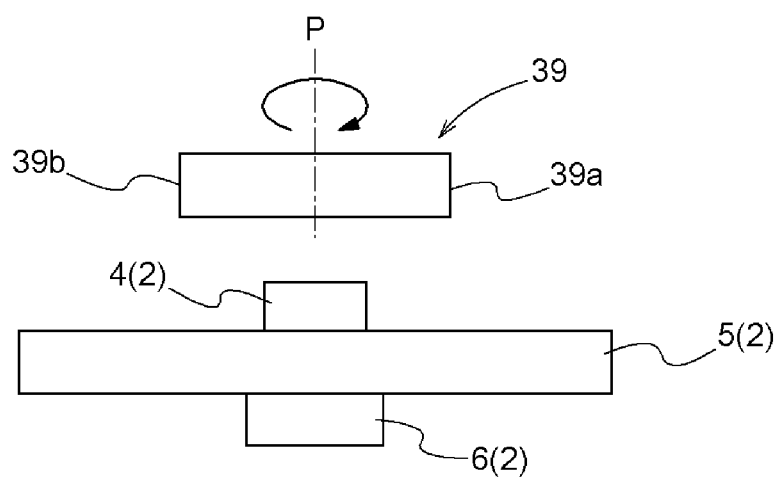
FIG. 3 is a view for explaining a configuration of a magnetic detection unit.

FIG. 3 illustrates a state where at least a portion of the stroke detection unit 4 is disposed at a position where the portion overlaps with the magnet 39 when viewed in the axial direction of the rotational axis P of the rotation member 30.

The stroke detection unit 4 mainly functions as a sensor unit that detects the rotation angle of the rotation member 30 which has rotated from a predetermined reference position (hereinafter, sometimes simply referred to as a "reference position") based on the magnetic force of the magnet 39.

The stroke detection unit 4 includes therein, for example, at least one magnetic detection element (an example of a magnetic force detection sensor) capable of detecting the magnitude of magnetism.

As the magnetic detection unit 2, the stroke detection unit 4 transmits a signal including at least the rotation angle of the rotation member 30 to the ECU 9. This signal may be simply referred to as a signal in the following description.

The switch detection unit 6 mainly functions as a sensor unit that detects that the rotation member 30 has rotated from a predetermined reference position by a predetermined angle or more based on the magnetic force of the magnet 39.

The switch detection unit 6 includes, for example, at least one magnetic detection element capable of detecting the magnitude of magnetism.

As the magnetic detection unit 2, the switch detection unit 6 transmits a signal including information about whether or not the rotation member 30 has rotated from the reference position by the predetermined angle or more, to the ECU 9. This signal may be simply referred to as a signal in the following description.

An appropriate magnetic detection element which is usable as the stroke detection unit 4 or the switch detection unit 6 may be selected in consideration of the sensitivity required for detecting the magnetic force of the magnet 39.

For example, a Hall element, a tunnel magneto-resistive element (so-called TMR element), an anisotropic magneto-resistive element (so-called AMR element), or a giant magneto-resistive (so-called GMR element) may be used as the magnetic detection element.

Since the magnetic detection element such as, for example, the Hall element or the TMR element alone outputs a weak signal when the magnetic force is detected or sensed, a magnetic detection IC, specifically, a magnetic field direction Hall IC or TMRIC, which forms a single integrated circuit together with an amplifier circuit that amplifies the signal, may be used as a relatively more appropriate magnetic detection element.

The substrate 5 is a wiring substrate on which the stroke detection unit 4 and the switch detection unit 6 are mounted, and is a main substrate of the magnetic detection unit 2.

The terminal 13 is connected to the substrate 5 to transmit a signal output from the stroke detection unit 4 or the switch detection unit 6.

The arrangement of the stroke detection unit 4 and the switch detection unit 6 in the magnetic detection unit 2 may adopt any of various forms.

An exemplary arrangement of the stroke detection unit 4 and the switch detection unit 6 will be described below.

First Embodiment of Magnetic Detection Unit

A first embodiment of the arrangement of the stroke detection unit 4 and the switch detection unit 6 in the magnetic detection unit 2 will be described.

In the first embodiment, as illustrated in FIG. 3, the stroke detection unit 4 is disposed on the rotational axis P so as to overlap with the magnet 39 when viewed in the axial direction. In addition, the switch detection unit 6 is disposed on the rotational axis P so as to overlap with the magnet 39 when viewed in the axial direction.

FIG. 3 illustrates a case of a simple configuration in which, when viewed in the plane of the substrate 5, the switch detection unit 6 is disposed on a different surface (the opposite side) from the surface of the substrate 5 on which the stroke detection unit 4 is disposed so that the stroke detection unit 4 and the switch detection unit 6 are disposed on the rotational axis P. Accordingly, the stroke detection unit 4 and the switch detection unit 6 may detect the magnetic poles appearing on the upper and lower surfaces of the magnet 39.

Second Embodiment of Magnetic Detection Unit

A second embodiment of the arrangement of the stroke detection unit 4 and the switch detection unit 6 in the magnetic detection unit 2 will be described.

Figure 4:
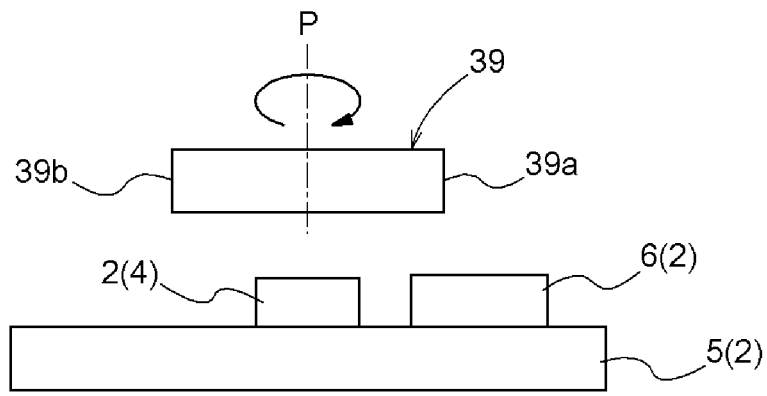
FIG. 4 is a view for explaining another configuration of the magnetic detection unit.

In the second embodiment, as illustrated in FIG. 4, the stroke detection unit 4 is disposed on the rotational axis P so as to overlap with the magnet 39 when viewed in the axial direction. Meanwhile, unlike the first embodiment, the switch detection unit 6 is disposed at a position deviated from the rotational axis P (a position that does not exist on the rotational axis P), and at least a portion of the switch detection unit 6 is disposed at a position where the portion overlaps with the magnet 39 when viewed in the axial direction of the rotational axis P of the rotation member 30.

That is, FIG. 4 illustrates a case of a simple configuration in which the switch detection unit 6 is disposed adjacent to the stroke detection unit 4 disposed on the rotational axis P on the substrate 5.

Third Embodiment of Magnetic Detection Unit

A third embodiment of the arrangement of the stroke detection unit 4 and the switch detection unit 6 in the magnetic detection unit 2 will be described.

Figure 5:
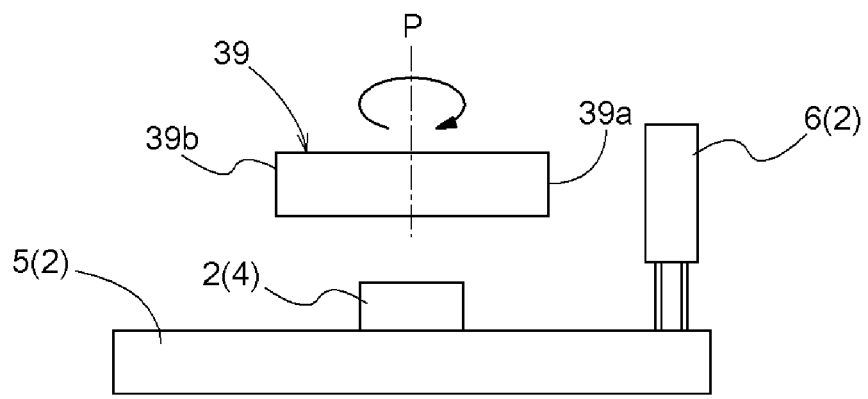
FIG. 5 is a view for explaining another configuration of the magnetic detection unit.

In the third embodiment, as illustrated in FIG. 5, the stroke detection unit 4 is disposed on the rotational axis P so as to overlap with the magnet 39 when viewed in the axial direction. Meanwhile, unlike the first embodiment, the switch detection unit 6 is disposed at a position where the switch detection unit 6 overlaps with the magnet 39 in the radial direction of the magnet 39.

FIG. 5 illustrates an example where the switch detection unit 6 is lifted upward in the axial direction from the substrate 5 by the terminal and is disposed at the position where the switch detection unit 6 overlaps with the magnet 39 when viewed in the radial direction of the magnet 39. As described above, since the magnetic pole of the magnet 39 appears on the side surface as well, the switch detection unit 6 may be disposed in this manner.

Fourth Embodiment of Magnetic Detection Unit

A fourth embodiment of the arrangement of the stroke detection unit 4 and the switch detection unit 6 in the magnetic detection unit 2 will be described.

Figure 6:
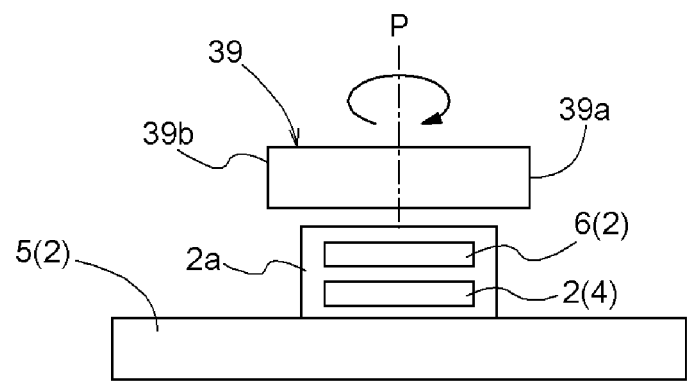
FIG. 6 is a view for explaining another configuration of the magnetic detection unit.

The fourth embodiment, as illustrated in FIG. 6, has a configuration in which the stroke detection unit 4 and the switch detection unit 6 are included in the same package 2a. Then, the stroke detection unit 4 and the switch detection unit 6 are disposed on the rotational axis P so as to overlap with the magnet 39 when viewed in the axial direction.

FIG. 6 illustrates an example where the package 2a is disposed on the rotational axis P so as to overlap with the magnet 39 when viewed in the axial direction, and is disposed on the surface of the substrate 5 which faces the magnet 39 when viewed in the plane of the substrate 5.

<Connection of Magnetic Detection Unit and ECU>

As illustrated in FIGS. 7 to 14, the magnetic detection unit 2 is connected to the ECU 9 to constitute a vehicle brake system. As for the connection between the magnetic detection unit 2 and the ECU 9, various connection forms may be adopted.

Hereinafter, an exemplary connection form of the magnetic detection unit 2 and the ECU 9 will be described.

In the following description of the connection form, a case where the magnetic detection unit 2 is connected to the ECU 9 via a wire (a power line or a signal line) electrically connected to the lead terminal 13 will be described. Descriptions of the relationship between the lead terminal 13 and the wire will be omitted.

In the following description, as illustrated in FIGS. 7 to 14, an example where the ECU 9 acquires a driving power from a battery BT through a switch S which is an engine key, a power line 90e, and a regulator is described.

In addition, in the following description, a case where the ECU 9 performs a cruise control, that is, a control to automatically drive a host vehicle at a constant speed while keeping a constant inter-vehicle distance from another vehicle that drives in the front of the host vehicle is exemplified. The present embodiment describes an example where the ECU 9 mainly includes an ECU 99 which executes the cruise control and a brake ECU 90 which performs the brake control.

<First Connection Form>

Figure 7:
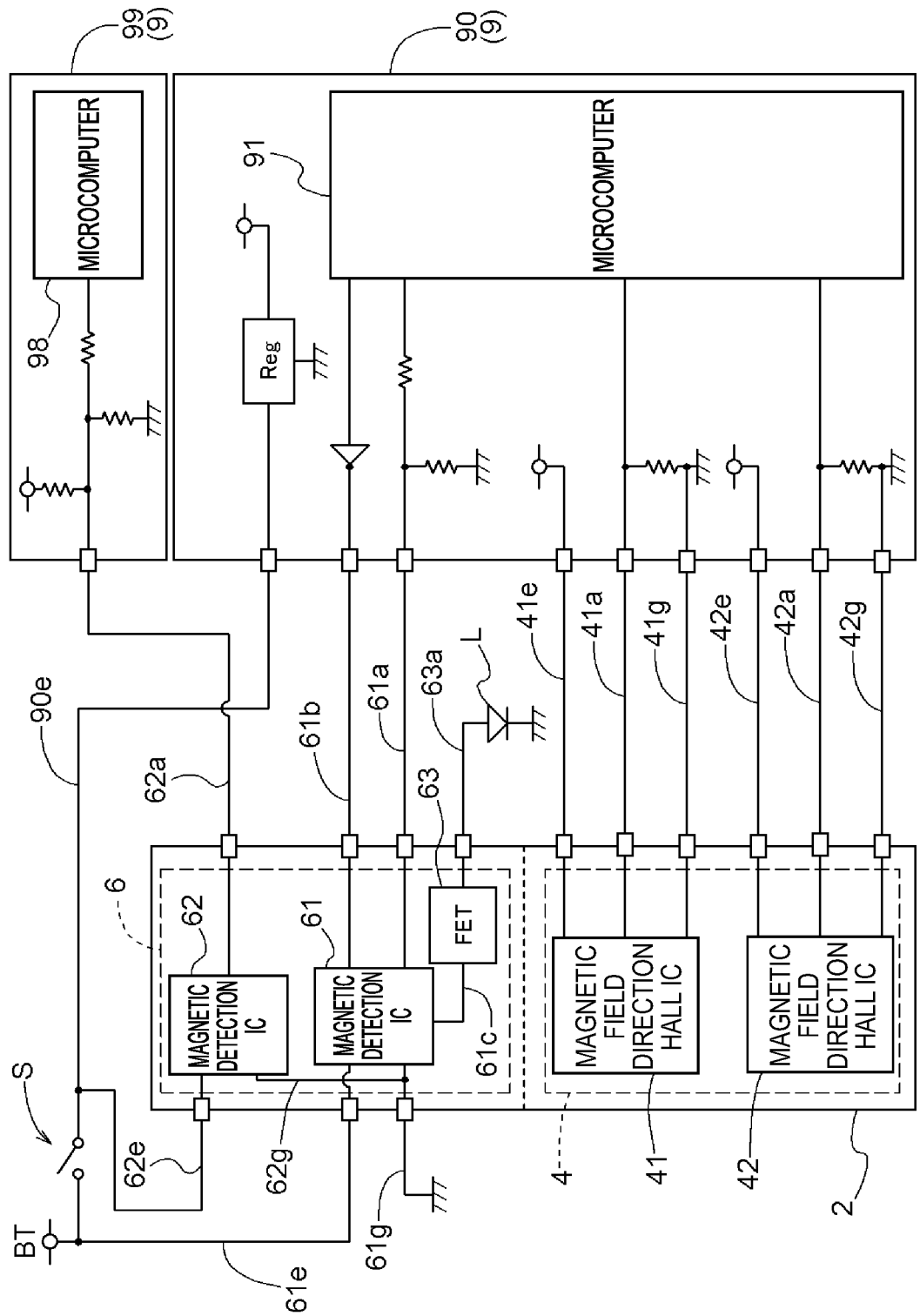
FIG. 7 is a view for explaining a connection relationship (analog connection) between the rotation angle detection device and an ECU.

FIG. 7 illustrates an embodiment related to a first connection form.

In the first connection form and a second connection form (see FIG. 8) and a third connection form (see FIG. 9) to be described later, the magnetic detection unit 2 and the ECU 9 mainly transmit signals in an analog manner. That is, the magnetic detection unit 2 outputs an analog signal to the brake ECU 90 of the ECU 9.

First, the first connection form will be described in detail.

The stroke detection unit 4 includes a magnetic force detector 41 (an example of the stroke magnetic detection sensor) and a magnetic force detector 42 (another example of the stroke magnetic detection sensor), and acquires multiplex information about the rotation angle of the rotation member 30.

The present embodiment describes a case where each of the magnetic force detectors 41 and the magnetic force detector 42 is a magnetic field direction Hall IC.

The magnetic force detector 41 acquires the driving power from the brake ECU 90 through a power line 41e. The magnetic force detector 41 is connected to a ground of the brake ECU 90 through a ground line 41g.

The magnetic force detector 41 transmits a signal to a microcomputer 91 which is a central processing unit of the brake ECU 90 through a signal line 41a.

The magnetic force detector 42 acquires the driving power from the brake ECU 90 through a power line 42e. The magnetic force detector 42 is connected to the ground of the brake ECU 90 through a ground line 42g.

The magnetic force detector 42 transmits a signal to the microcomputer 91 through a signal line 42a.

In the present embodiment, the direction and the magnitude of a magnetic force detected by the magnetic force detector 41 and the direction and the magnitude of a magnetic force detected by the magnetic force detector 42 are transmitted respectively as analog signals based on the magnitude of a voltage.

In the present embodiment, the signal of the magnetic force detector 41 and the signal of the magnetic force detector 42 are configured to become a predetermined voltage (e.g., 5 volts as a predetermined voltage) when added, and when the added voltage is not the predetermined voltage, the microcomputer 91 determines that the stroke detection unit 4 is faulty.

The switch detection unit 6 includes a magnetic force detector 61 and a magnetic force detector 62, each of which is a magnetic detection IC, and acquires information about whether or not the rotation member 30 has rotated by a predetermined angle or more.

The magnetic force detector 61 acquires the driving power from the vehicle battery BT through a power line 61e. The magnetic force detector 61 is connected to a ground through a ground line 61g.

The magnetic force detector 61 transmits a signal to the microcomputer 91 through a signal line 61a.

The magnetic force detector 61 is electrically connected, as the magnetic detection unit 2, to a stop lamp L, and the magnetic force detector 61 turns on the stop lamp L when the rotation member 30 has rotated by the predetermined angle or more.

In the present embodiment, a signal (a predetermined voltage in the present embodiment) for turning on the stop lamp L is transmitted (applied in the present embodiment) to a field effect transistor 63 through a signal line 61c, and the field effect transistor 63 turns on the stop lamp L through a power line 63a.

The present embodiment describes an example where, when the brake control operation has been executed in the cruise control, the microcomputer 91 transmits a signal indicating that the brake control operation has been executed, to the magnetic force detector 61 through a signal line 61b, and then, the magnetic force detector 61 which has received the signal indicating that the brake control operation has been executed turns on the stop lamp L.

The magnetic force detector 62 acquires the driving power from the vehicle battery BT through the switch S and a power line 62e. The magnetic force detector 62 is connected to a ground through a ground line 62g connected to the ground line 61g.

The magnetic force detector 62 transmits a signal to a microcomputer 98 of the ECU 99 through a signal line 62a. When receiving a signal including information indicating that the rotation member 30 has rotated by the predetermined angle or more from the magnetic force detector 62, the ECU 99 (the microcomputer 98) stops the cruise control and switches to a manual operation.

In the present embodiment, the signal of the magnetic force detector 61 and the signal of the magnetic force detector 62 are transmitted as on/off signals based on the magnitude of a voltage.

In the present embodiment, the magnetic detection unit 2 is connected to each of the signal line 41a, the power line 41e, the ground line 41g, the signal line 42a, the power line 42e, the ground line 42g, the signal line 61a, the signal line 61b, the power line 61e, the ground line 61g, the signal line 62a, the power line 62e, and the power line 63a through the lead terminal 13 (see FIG. 1) corresponding to each line.

That is, in the present embodiment, the magnetic detection unit 2 has a simple wiring structure of being connected only to the small number of, that is, thirteen lead terminals 13 (see FIG. 1) in order to be connected to the signal line 41a, the power line 41e, the ground line 41g, the signal line 42a, the power line 42e, the ground line 42g, the signal line 61a, the signal line 61b, the power line 61e, the ground line 61g, the signal line 62a, the power line 62e, and the power line 63a.

<Second Connection Form>

A second connection form is different from the first connection form in that the second connection form does not adopt the magnetic force detector 62 adopted in the first connection form.

Figure 8:
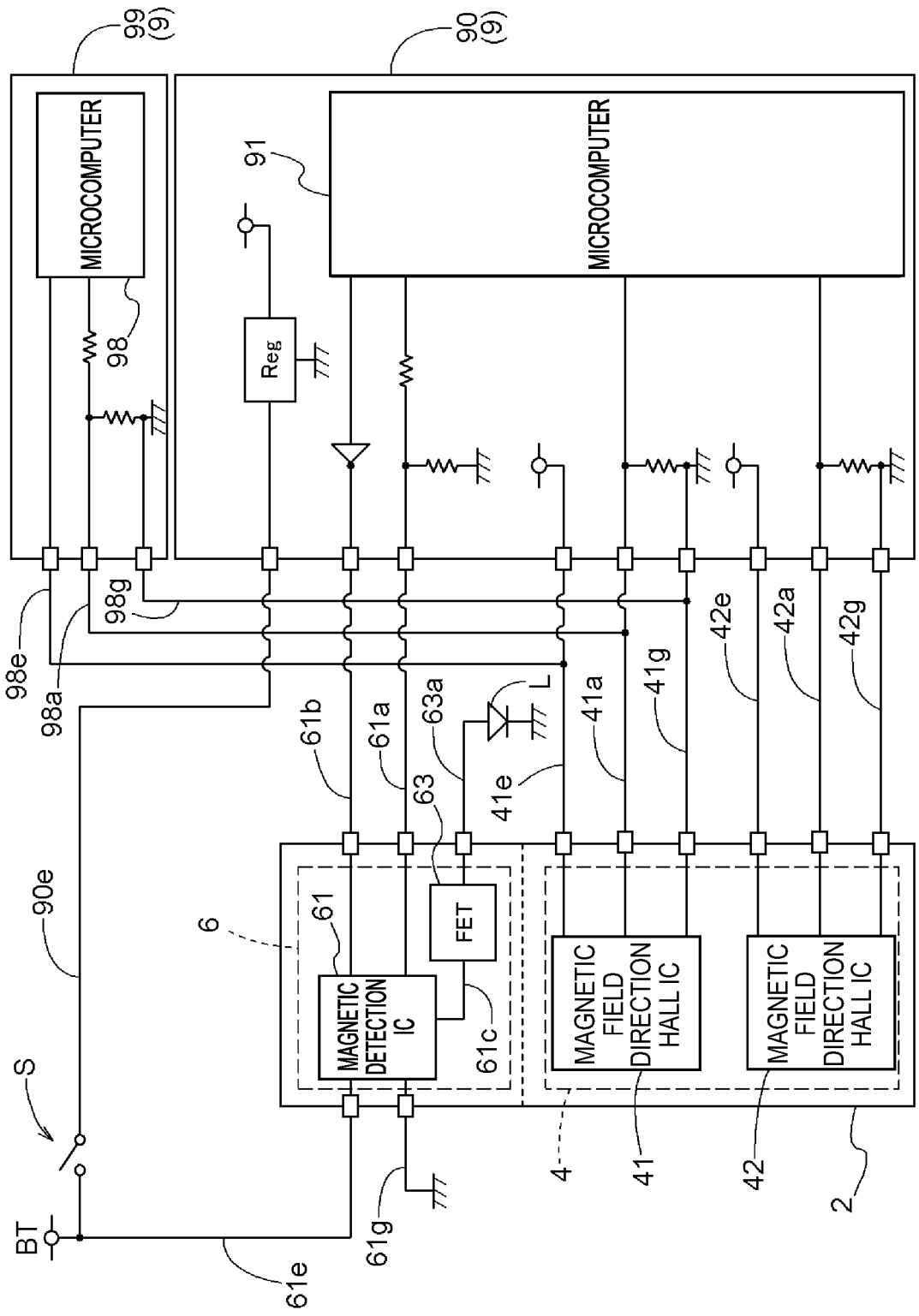
FIG. 8 is a view for explaining another connection relationship (analog connection) between the rotation angle detection device and the ECU.

FIG. 8 illustrates an embodiment related to the second connection form.

In the present embodiment, instead of receiving the signal including information indicating that the rotation member 30 has rotated by the predetermined angle or more from the magnetic force detector 62 in the first connection form, the ECU 99 receives a signal including information about the rotation angle of the magnetic force detector 41 through a signal line 98a branched from the signal line 41a. When it is determined that the rotation member 30 has rotated by the predetermined angle or more based on the signal including information about the rotation angle of the rotation member 30, the ECU 99 (the microcomputer 98) stops the cruise control and switches to a manual operation.

In addition, FIG. 8 illustrates an example where the microcomputer 98 acquires information about a (ratiometric) power supply voltage for the output of the magnetic force detector 42 based on the power supply voltage through a power line 98e branched from the power line 41e. In addition, FIG. 8 illustrates an example where the ground to which the signal line 98a is connected and the ground to which the ground line 41g is connected are connected to each other via a ground line 98g.

In the present embodiment, the magnetic detection unit 2 has a simple wiring structure of being connected only to the small number of, that is, eleven lead terminals 13 (see FIG. 1) in order to be connected to the signal line 41a, the power line 41e, the ground line 41g, the signal line 42a, the power line 42e, the ground line 42g, the signal line 61a, the signal line 61b, the power line 61e, the ground line 61g, and the power line 63a.

<Third Connection Form>

A third connection form is different from the first connection form in that the third connection form does not adopt the magnetic force detector 62 adopted in the first connection form.

Figure 9:
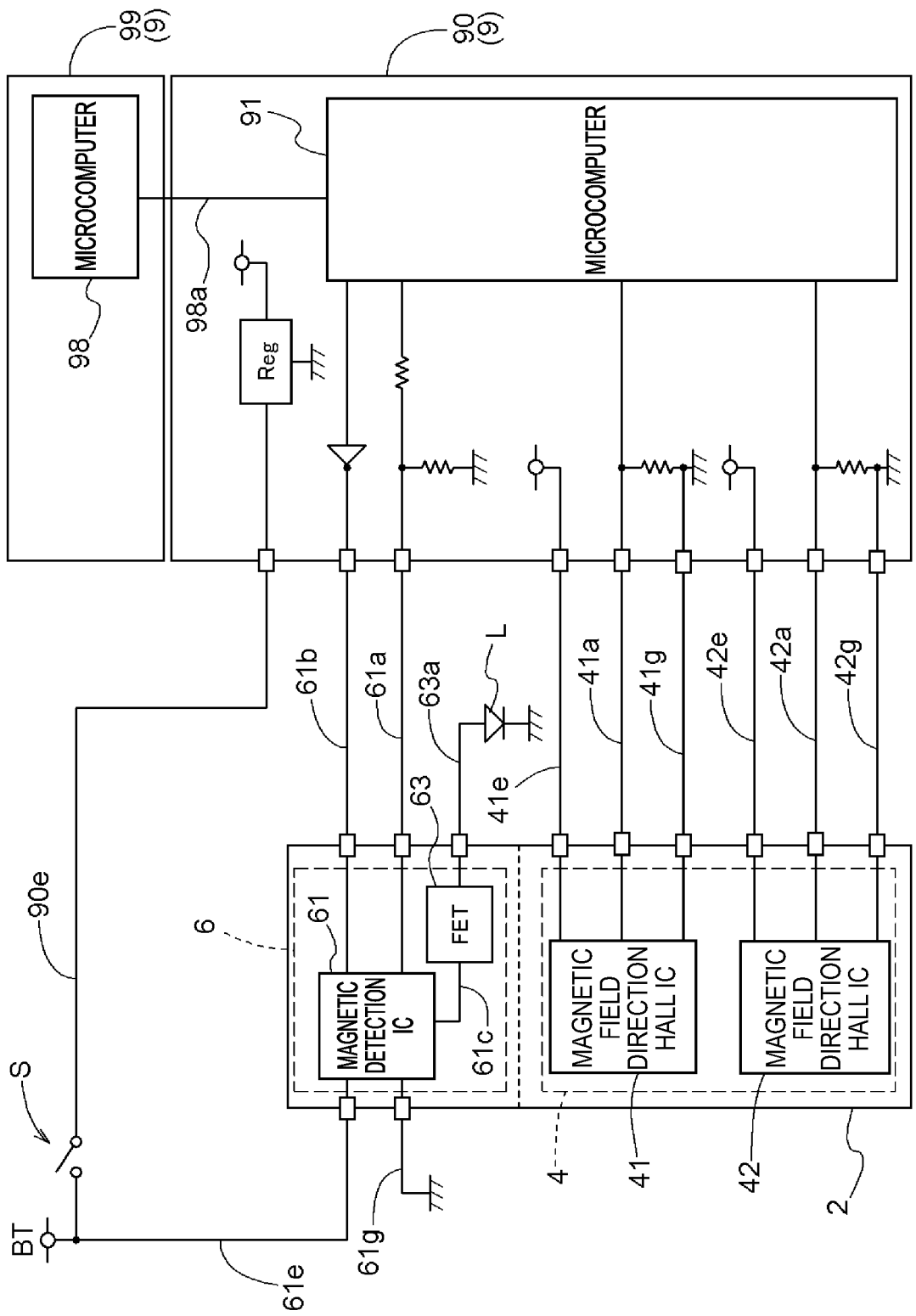
FIG. 9 is a view for explaining another connection relationship (analog connection) between the rotation angle detection device and the ECU.

FIG. 9 illustrates an embodiment related to the third connection form.

In the present embodiment, instead of receiving the signal including information indicating that the rotation member 30 has rotated by the predetermined angle or more from the magnetic force detector 62 in the first connection form, the ECU 99 receives a signal including information about the rotation angle of the rotation member 30 acquired from the stroke detection unit 4 by the microcomputer 91 through the signal line 98a connected from the microcomputer 98 to the microcomputer 91. When it is determined that the rotation member 30 has rotated by the predetermined angle or more based on the signal including information about the rotation angle of the rotation member 30, the ECU 99 (the microcomputer 98) stops the cruise control and switches to a manual operation.

In the present embodiment, the magnetic detection unit 2 has a simple wiring structure of being connected only to the small number of, that is, eleven lead terminals 13 (see FIG. 1) in order to be connected to the signal line 41a, the power line 41e, the ground line 41g, the signal line 42a, the power line 42e, the ground line 42g, the signal line 61a, the signal line 61b, the power line 61e, the ground line 61g, and the power line 63a.

<Fourth Connection Form>

Figure 10:
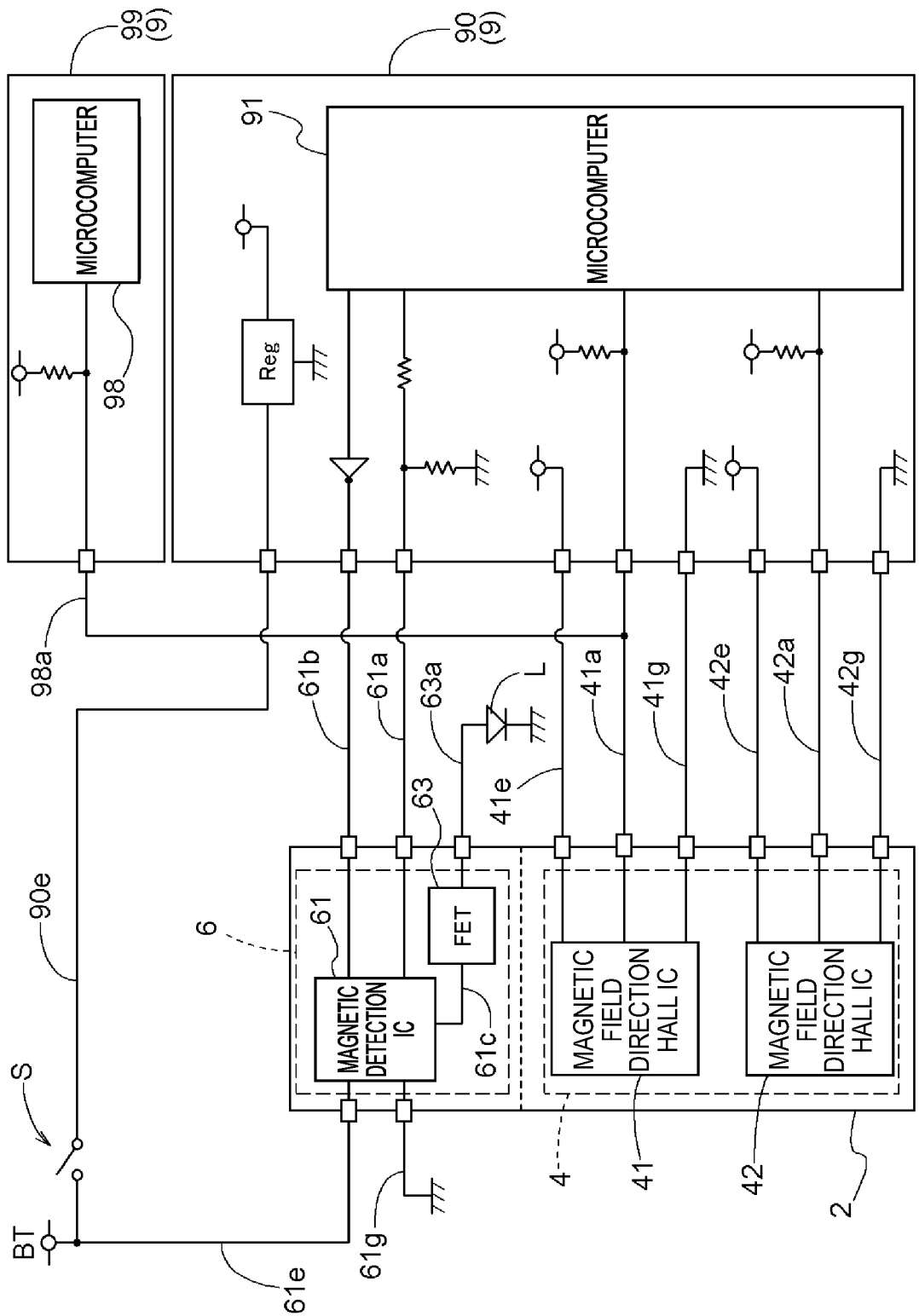
FIG. 10 is a view for explaining another connection relationship (digital connection) between the rotation angle detection device and the ECU.

FIG. 10 illustrates an embodiment related to a fourth connection form.

In the fourth connection form and a fifth connection form to an eighth connection form (see FIGS. 11 to 14) to be described later, unlike the first connection form to the third connection form described above, the magnetic detection unit 2 and the ECU 9 mainly transmit signals in a digital manner. That is, the magnetic detection unit 2 outputs a digital signal to the brake ECU 90 of the ECU 9.

In addition, the fourth connection form is different from the first connection form in that the fourth connection form does not adopt the magnetic force detector 62 adopted in the first connection form.

In the present embodiment, unlike the first connection form in which the signal of the magnetic force detector 41 and the signal of the magnetic force detector 42 are analog signals, the signal of the magnetic force detector 41 and the signal of the magnetic force detector 42 are transmitted as digital signals, respectively.

Specifically, the magnetic force detector 41 digitizes the signal and transmits (outputs) the digital signal to the microcomputer 91 which is the central processing unit of the brake ECU 90 through the signal line 41a. Similarly, the magnetic force detector 42 digitizes the signal and transmits (outputs) the digital signal to the microcomputer 91 which is the central processing unit of the brake ECU 90 through the signal line 42a.

In the present embodiment, the microcomputer 91 compares (e.g., differentiates) the signal of the magnetic force detector 41 and the signal of the magnetic force detector 42 with each other, and determines that the stroke detection unit 4 is faulty when the difference is equal to or greater than a predetermined value.

In the present embodiment, instead of receiving, as an analog signal, the signal including information indicating that the rotation member 30 has rotated by the predetermined angle or more from the magnetic force detector 62 in the first connection form, the ECU 99 receives, as a digital signal, the signal including information about the rotation angle of the stroke detection unit 4 (the magnetic force detector 41) through the signal line 98a branched from the signal line 41a.

In the present embodiment, the magnetic detection unit 2 has a simple wiring structure of being connected only to the small number of, that is, eleven lead terminals 13 (see FIG. 1) in order to be connected to the signal line 41a, the power line 41e, the ground line 41g, the signal line 42a, the power line 42e, the ground line 42g, the signal line 61a, the signal line 61b, the power line 61e, the ground line 61g, and the power line 63a.

<Fifth Connection Form>

The fifth connection form is mainly different from the fourth connection form in that the magnetic detection unit 2 includes a fault detector 21, and is substantially the same as the fourth connection form in the other points.

Figure 11:
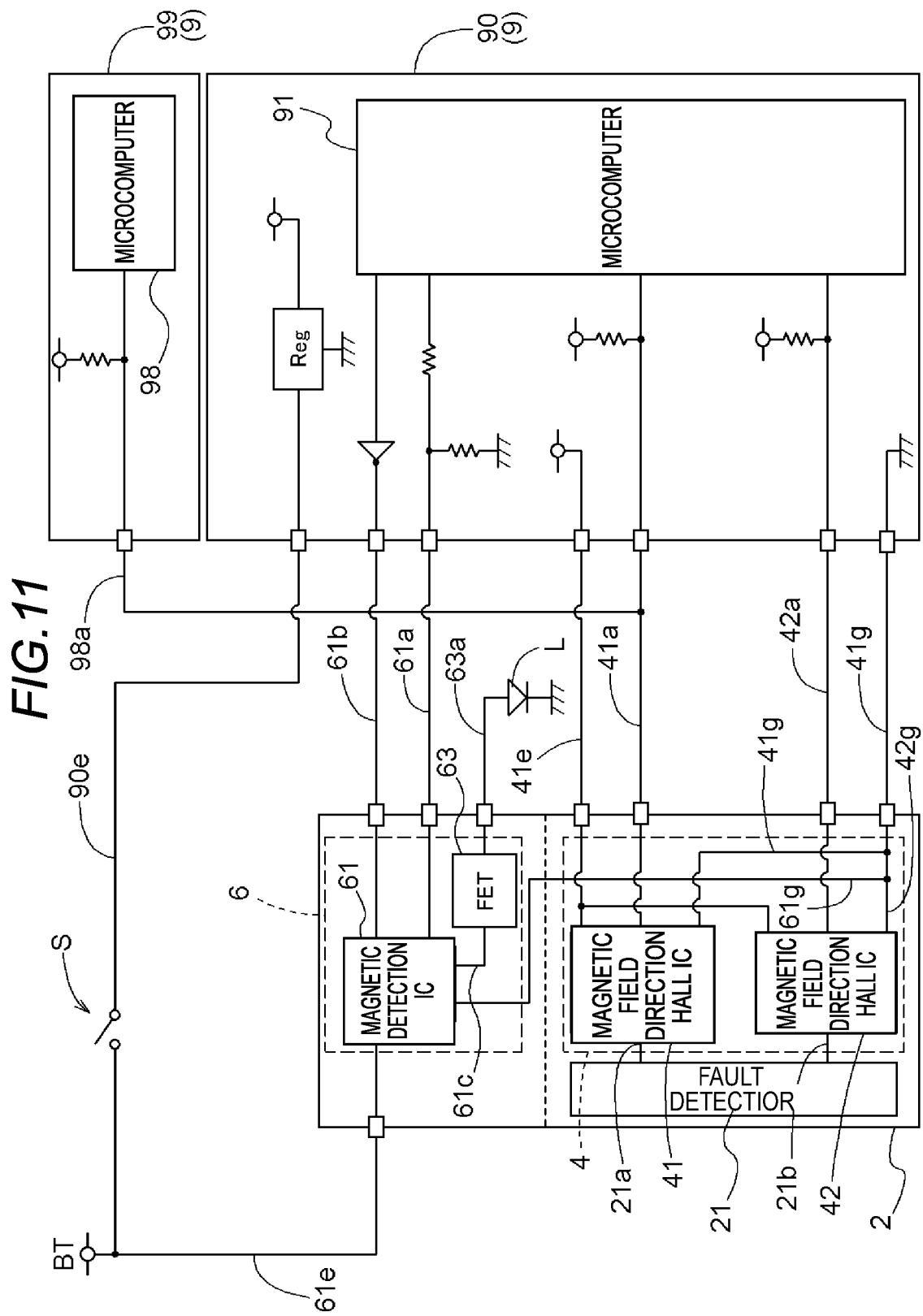
FIG. 11 is a view for explaining another connection relationship (digital connection) between the rotation angle detection device and the ECU.

FIG. 11 illustrates an embodiment related to the fifth connection form.

The fault detector 21 is a comparative processing unit that compares the signal of the magnetic force detector 41 and the signal of the magnetic force detector 42 with each other and determines that the stroke detection unit 4 is faulty when the difference is equal to or greater than a predetermined value.

In the present embodiment, the fault detector 21 acquires the signal of the magnetic force detector 41 through a signal line 21a and acquires the signal of the magnetic force detector 42 through a signal line 21b, to compare the signal of the magnetic force detector 41 and the signal of the magnetic force detector 42 with each other.

When it is determined that the stroke detection unit 4 is faulty, the fault detector 21 transmits a signal including fault information indicating that the stroke detection unit 4 is faulty, to the microcomputer 91. At this time, the fault detector 21 superimposes the signal including fault information on the signal of the magnetic force detector 41 as a digital signal, and transmits the signal to the microcomputer 91 through the signal line 21a, the magnetic force detector 41, and the signal line 41a.

That is, the magnetic detection unit 2 superimposes the signal of the stroke detection unit 4 (the magnetic force detector 41) on the signal including fault information detected by the fault detector 21, and outputs the superimposed signal to the ECU 9.

In addition, FIG. 11 illustrates an example where the ground line 42g and the ground line 61g are connected to the ground line 41g so as to be connected to the ground of the ECU 9 through the ground line 41g.

In the present embodiment, the magnetic detection unit 2 has a simple wiring structure of being connected only to the small number of, that is, eight lead terminals 13 (see FIG. 1) in order to be connected to the signal line 41a, the power line 41e, the ground line 41g, the signal line 42a, the signal line 61a, the signal line 61b, the power line 61e, and the power line 63a.

<Sixth Connection Form>

The sixth connection form is different from the fifth connection form in terms of a connection form of the magnetic force detector 42 and the signal line 42a, and is the same as the fifth connection form in the other points.

Figure 12:
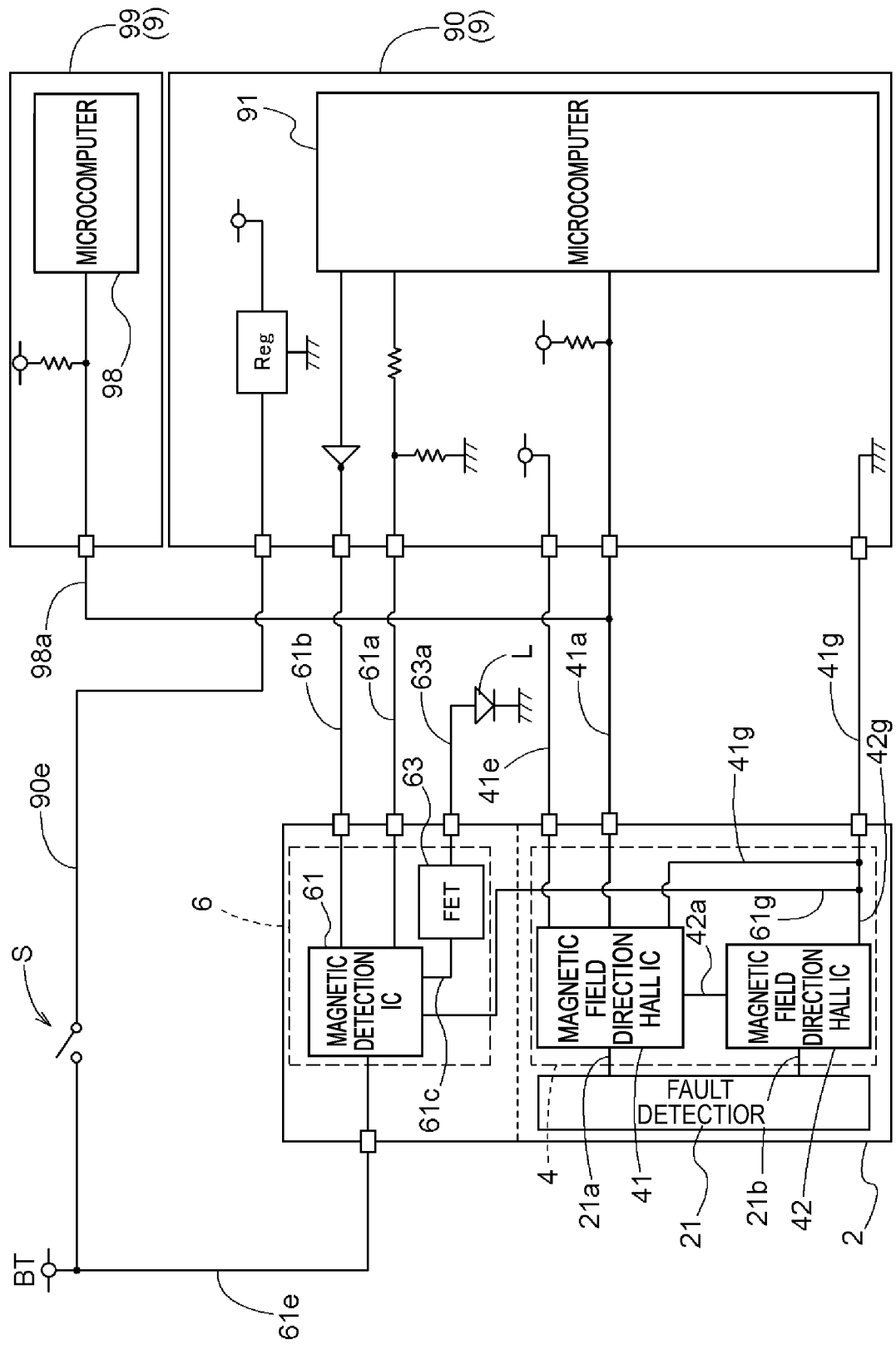
FIG. 12 is a view for explaining another connection relationship (digital connection) between the rotation angle detection device and the ECU.

FIG. 12 illustrates an embodiment related to the sixth connection form.

In the present embodiment, the magnetic force detector 42 transmits the signal of the magnetic force detector 42 to the ECU 9 via the magnetic force detector 41. Specifically, the magnetic force detector 42 is not connected to the ECU 9 through the signal line 42a, but the magnetic force detector 42 and the magnetic force detector 41 are connected to each other through the signal line 42a. The magnetic force detector 42 transmits the signal thereof to the magnetic force detector 41 through the signal line 42a.

The magnetic force detector 41 that has received the signal of the magnetic force detector 42 superimposes, as the stroke detection unit 4, the signal of the magnetic force detector 41 on the signal of the magnetic force detector 42, and transmits the superimposed signal to the ECU 9 through one signal line 41a.

In the present embodiment, the magnetic detection unit 2 has a simple wiring structure of being connected only to the lead terminals 13 as few as seven (see FIG. 1) in order to be connected to the signal line 41a, the power line 41e, the ground line 41g, the signal line 61a, the signal line 61b, the power line 61e, and the power line 63a.

<Seventh Connection Form>

The seventh connection form is different from the sixth connection form in that the seventh connection form does not adopt the magnetic force detector 42 adopted in the sixth connection form.

In addition, the seventh connection form is different from the sixth connection form in that in the seventh connection form, the fault detector 21 is connected to the magnetic force detector 61 instead of being connected to the magnetic force detector 42.

In addition, the seventh connection form is different from the sixth connection form in that in the seventh connection form, a magnetic detection IC of the magnetic force detector 61 is a magnetic field direction Hall IC.

In addition, the seventh connection form is different from the sixth connection form in that in the seventh connection form, the signal line 41a is connected to the magnetic force detector 61 instead of being connected to the ECU 9.

In addition, the seventh connection form is different from the sixth connection form in that in the seventh connection form, the magnetic detection unit 2 operates by switching an operation state between an intermittent mode in which the magnetic detection unit 2 intermittently operates when not receiving a wakeup signal from the ECU 9 (the microcomputer 91 of the brake ECU 90) and a continuous mode in which the magnetic detection unit 2 releases the intermittent mode and continuously operates when receiving the wakeup signal from the ECU 9.

In the other points, the seventh connection form is the same as the sixth connection form.

Figure 13:
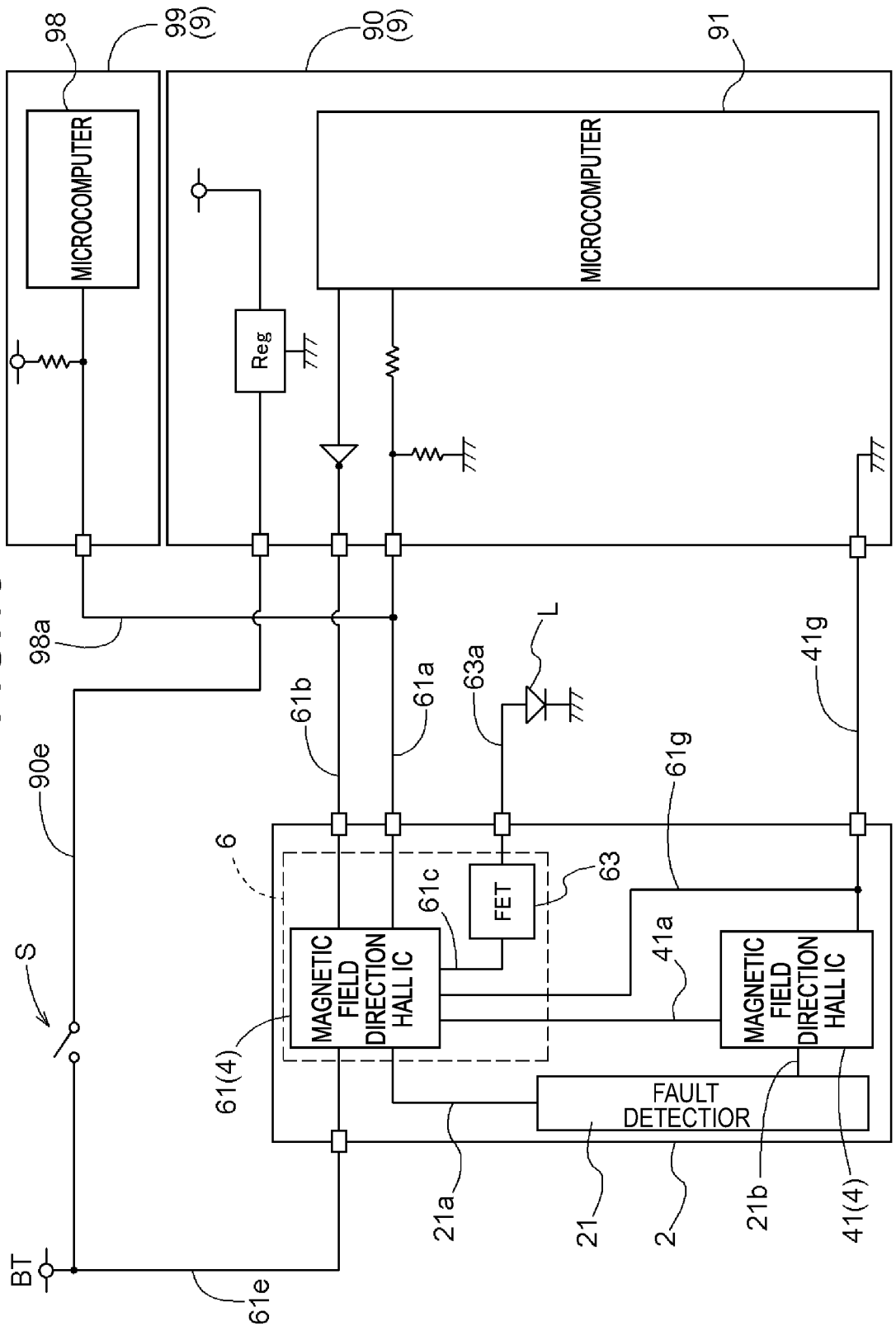
FIG. 13 is a view for explaining another connection relationship (digital connection) between the rotation angle detection device and the ECU.

FIG. 13 illustrates an embodiment related to the seventh connection form.

In the present embodiment, when the vehicle is being permitted for the driving operation, the ECU 9 transmits a wakeup signal to the magnetic detection unit 2. When the vehicle is not being permitted for the driving operation, the ECU 9 does not transmit a wakeup signal to the magnetic detection unit 2.

When not receiving the wakeup signal from the ECU 9, the magnetic detection unit 2 operates in the intermittent mode.

In the intermittent mode, the magnetic detection unit 2 causes the switch detection unit 6 to intermittently operate, and also stops the operation of the stroke detection unit 4. In this case, since the switch detection unit 6 intermittently operates, the power consumption of the switch detection unit 6 is reduced. Since the stroke detection unit 4 stops the operation, the stroke detection unit consumes no power.

In the intermittent mode, the magnetic force detector 61 of the switch detection unit 6 turns on the stop lamp L when the rotation member 30 has rotated by the predetermined angle or more.

When receiving the wakeup signal from the ECU 9, the magnetic detection unit 2 operates in the continuous mode.

In the continuous mode, the switch detection unit 6 operates in a mode of detecting the rotation angle by which the rotation member 30 has rotated from the reference position based on the magnetic force of the magnet 39. That is, in the present embodiment, the magnetic force detector 61 operates in a mode of detecting the rotation angle by which the rotation member 30 has rotated from the reference position based on the magnetic force of the magnet 39.

In the continuous mode, the magnetic force detector 61 transmits a signal including the rotation angle by which the rotation member 30 has rotated from the reference position, to the ECU 9 (the microcomputer 91 of the brake ECU 90).

In the continuous mode, the magnetic detection unit 2 causes the switch detection unit 6 and the stroke detection unit 4 to operate together.

In the continuous mode according to the present embodiment, the magnetic force detector 41 of the stroke detection unit 4 transmits the signal of the magnetic force detector 41 to the ECU 9 through the magnetic force detector 61. Specifically, the magnetic force detector 41 is not connected to the ECU 9 through the signal line 41a, but the magnetic force detector 41 and the magnetic force detector 61 are connected to each other through the signal line 41a. The magnetic force detector 41 transmits the signal of the magnetic force detector 41 to the magnetic force detector 61 through the signal line 41a.

The magnetic force detector 61 which has received the signal of the magnetic force detector 41 superimposes, as the stroke detection unit 4, the signal of the magnetic force detector 41 on the signal of the magnetic force detector 61, and transmits the superimposed signal to the ECU 9 through one signal line 61a.

In the continuous mode of the present embodiment, the fault detector 21 acquires the signal of the magnetic force detector 61 which operates as the stroke detection unit 4 through the signal line 21*a*, acquires the signal of the magnetic force detector 41 through the signal line 21*b*, and compares the signal of the magnetic force detector 61 and the signal of the magnetic force detector 41 with each other.

The fault detector 21 compares the signal of the magnetic force detector 61 and the signal of the magnetic force detector 41 with each other, and determines that the stroke detection unit 4 is faulty when the difference is equal to or greater than a predetermined value.

When it is determined that the stroke detection unit 4 (the magnetic force detector 61 and the magnetic force detector 41) is faulty, the fault detector 21 transmits a signal including fault information indicating that the stroke detection unit 4 is faulty to the microcomputer 91. At this time, the fault detector 21 superimposes the signal including fault information on the signal of the magnetic force detector 61 and transmits the digital signal to the microcomputer 91 through the signal line 21*a*, the magnetic force detector 61, and the signal line 61*a*.

Instead of receiving the signal including information about the rotation angle of the stroke detection unit 4 through the signal line 98*a* branched from the signal line 41*a* as in the seventh connection form, the ECU 99 receives the signal including information about the rotation angle of the stroke detection unit 4 through the signal line 98*a* branched from the signal line 61*a*.

In the present embodiment, the magnetic detection unit 2 has a simple wiring structure of being connected only to the small number of, that is, five lead terminals 13 (see FIG. 1) in order to be connected to the ground line 41*g*, the signal line 61*a*, the signal line 61*b*, the power line 61*e*, and the power line 63*a*.

<Eighth Connection Form>

The eighth connection form is different from the seventh connection form in that the eighth connection from does not include the signal line 61*b* adopted in the seventh connection form.

In terms of the other points, the eighth connection form is the same as the seventh connection form.

Figure 14:
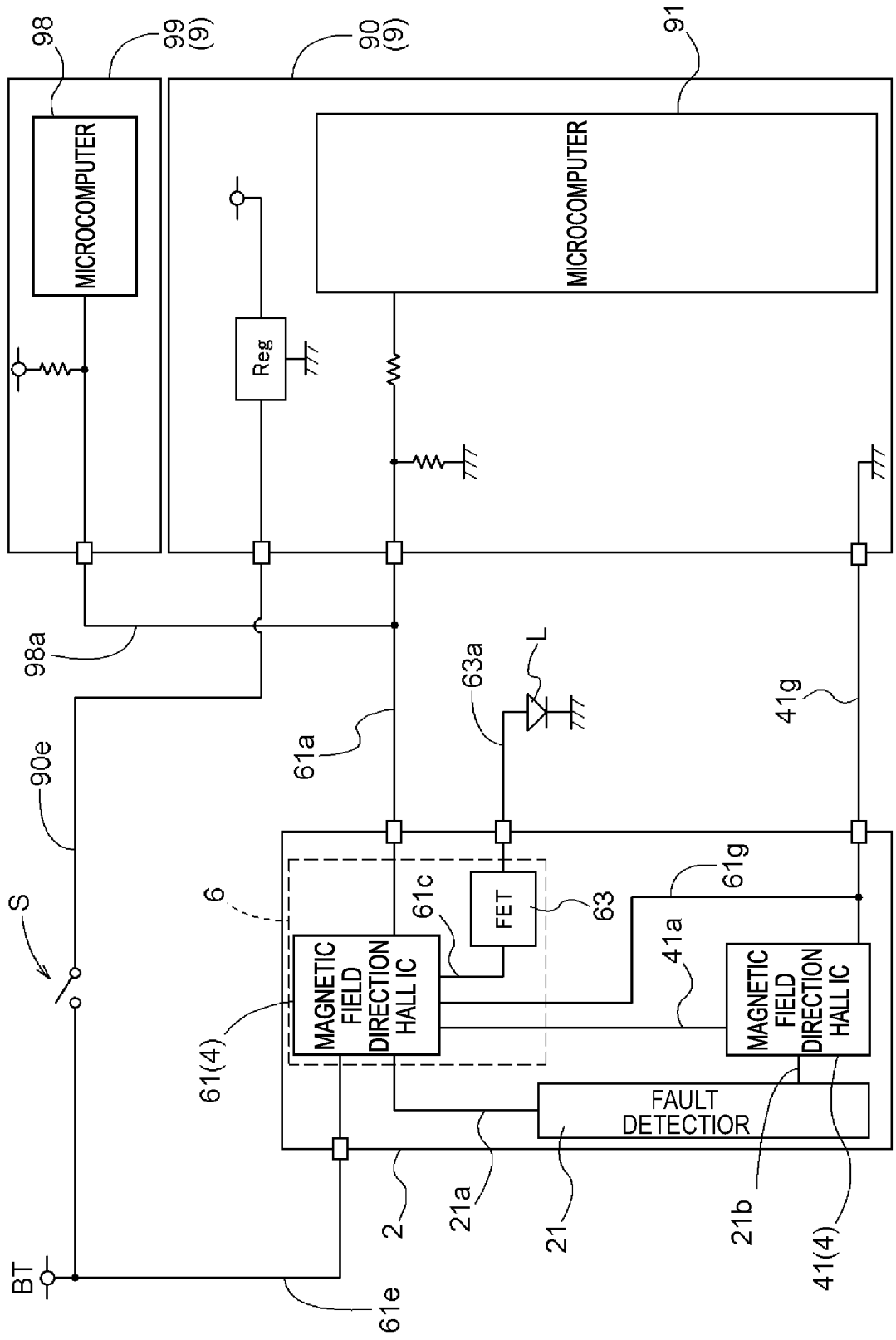
FIG. 14 is a view for explaining another connection relationship (digital connection) between the rotation angle detection device and the ECU.

FIG. 14 illustrates an embodiment related to the eighth connection form.

The present embodiment illustrates an example where, when the brake control operation has been executed in the cruise control, instead of transmitting the signal indicating that the brake control operation has been executed to the magnetic force detector 61 through the signal line 61*b*, the microcomputer 91 transmits the signal indicating that the brake control operation has been executed, as a digital signal to the magnetic force detector 61 through the signal line 61*a*, and then, the magnetic force detector 61 that has received the signal indicating that the brake control operation has been executed turns on the stop lamp L.

In the present embodiment, the magnetic detection unit 2 has a simple wiring structure of being connected only to the lead terminals 13 as few as four (see FIG. 1) in order to be connected to the ground line 41*g*, the signal line 61*a*, the power line 61*e*, and the power line 63*a*.

As described above, it is possible to provide a rotation angle detection device having a simplified structure.

Other Embodiments (1) The above-described embodiment has illustrated a case where a magnetic field direction Hall IC is adopted as the magnetic force detector 41 or the magnetic force detector 42. However, instead of adopting the magnetic field direction Hall IC, any other magnetic detection IC, for example, a TMRIC may be adopted.

Similarly, in the above-described embodiment, a case where the magnetic force detector 61 or the magnetic force detector 62 is a magnetic detection IC has been described. However, a magnetic field direction Hall IC or a TMRIC may be adopted as a specific example of the magnetic detection IC.

(2) The above-described embodiment has exemplified a case where a magnetic field direction Hall IC is adopted as the magnetic detection IC. However, any other magnetic detection IC, specifically, an AMRIC or a GMRIC in which an AMR element or a GMR element and an amplifier circuit form a single integrated circuit may be adopted instead of the magnetic field direction Hall IC.

(3) The above-described embodiment has exemplified the case where the signal of the magnetic force detector 41 and the signal of the magnetic force detector 42 are transmitted as analog signals. However, the signal of the magnetic force detector 41 and the signal of the magnetic force detector 42 may be separately transmitted such that any one of the signals is transmitted as an analog signal and the other signal is transmitted as a digital signal.

(4) The above-described embodiment has exemplified a case where, when the signal of the magnetic force detector 41 and the signal of the magnetic force detector 42 are transmitted respectively as digital signals, the microcomputer 91 compares (e.g., differentiates) the signal of the magnetic force detector 41 and the signal of the magnetic force detector 42 with each other and determines that the stroke detection unit 4 is faulty when the difference is equal to or greater than a predetermined value. However, when the magnetic detection unit 2 includes the fault detector 21, the microcomputer 91 may not compare the signal of the magnetic force detector 41 and the signal of the magnetic force detector 42 with each other in some cases.

(5) The above-described embodiment has exemplified a case where the magnetic force detector 61 is electrically connected as the magnetic detection unit 2 to the stop lamp L and the magnetic force detector 61 turns on the stop lamp L when the rotation member 30 has rotated by a predetermined angle or more. However, when the ECU 9 and the stop lamp L are electrically connected to each other and the ECU 9 (the microcomputer 91 or the microcomputer 98) receives a signal including information indicating that the rotation member 30 has rotated by the predetermined angle or more, the stop lamp L may be turned on based on an instruction of the microcomputer 91 or the microcomputer 98 in some cases.

(6) The above-described embodiment has exemplified a case where the fault detector 21 is a comparative processing unit that compares the signal of the magnetic force detector 41 the signal of the magnetic force detector 42 with each other and determines that the stroke detection unit 4 is faulty when the difference is equal to or greater than a predetermined value. However, the fault detector 21 may compare the signals of the magnetic force detector 41 and the magnetic force detector 42 with the internal signal of an IC in the fault detector 21, may detect that the magnetic force detector 41 or the magnetic force detector 42 is faulty when the difference is equal to or greater than a predetermined value, and may determine that the stroke detection unit 4 is faulty based on this detection.

In this case, a pair of fault detection units 21 may be provided respectively in the magnetic force detector 41 and the magnetic force detector 42. Then, the fault detector may compare the signal of the magnetic force detector 41 with the internal signal of the IC in the fault detector 21 paired with the magnetic force detector 41, and may detect that the magnetic force detector 41 is faulty. Similarly, the fault detector may compare the signal of the magnetic force detector 42 with the internal signal of the IC in the fault detector 21 paired with the magnetic force detector 42, and may detect that the magnetic force detector 42 is faulty. In this way, it is possible to detect a case where either the magnetic force detector 41 or the magnetic force detector 42 is faulty or a case where the magnetic force detector 41 and the magnetic force detector 42 are faulty.

(7) The above-described embodiment has exemplified a case where, on the substrate 5, the stroke detection unit 4 is disposed on the rotational axis P so as to overlap with the magnet 39 when viewed in the axial direction and the switch detection unit 6 is disposed adjacent to the stroke detection unit 4 (see FIG. 4). In addition, the above-described embodiment has exemplified a case where the stroke detection unit 4 is disposed on the rotational axis P and the switch detection unit 6 is disposed at a position where the switch detection unit 6 overlaps with the magnet 39 when viewed in the radial direction of the magnet 39 (see FIG. 5). However, in these cases, the stroke detection unit 4 and the switch detection unit 6 may be included in the same package, and the stroke detection unit 4, the switch detection unit 6, and the package may be disposed on the rotational axis P so as to overlap with the magnet 39 when viewed in the axial direction and may be disposed on the surface of the substrate 5 which faces the magnet 39.

In addition, the configuration disclosed in the above-described embodiment (including other embodiments) may be applied in combination with the configuration disclosed in the other embodiments unless a contradiction occurs. In addition, the embodiments described herein are merely exemplary, and the embodiments of the present disclosure are not limited to the embodiments described here and may be appropriately modified within a scope that does not deviate from the object of the present disclosure.

The present disclosure may be applied for providing a rotation angle detection device having a simplified structure.

A feature of a rotation angle detection device for a vehicle brake according to an aspect of this disclosure resides in that the rotation angle detection device includes a housing configured to accommodate a magnetic detection unit that detects a change in a magnetic force, a rotation member supported so as to be rotatable relative to the housing, and a magnet held by the rotation member and configured to rotate integrally with the rotation member, wherein the magnetic detection unit includes a stroke detection unit disposed on a substrate and a switch detection unit disposed on the substrate, the stroke detection unit detects a rotation angle by which the rotation member has rotated from a reference position based on a magnetic force of the magnet, the switch detection unit detects that the rotation member has rotated from the reference position by a predetermined angle or more, and at least a portion of the stroke detection unit is disposed at a position where the portion overlaps with the magnet when viewed in an axial direction of a rotational axis of the rotation member.

According to the above configuration, the magnetic detection unit includes the stroke detection unit disposed on the substrate and the switch detection unit disposed on the substrate, so that the magnetic detection unit includes the stroke detection unit and the switch detection unit on a single substrate. Therefore, it is possible to reduce the number of components of the magnetic detection unit, which may result in a reduced size, a lightweight, and a simplified structure.

In addition, according to the above configuration, as for the stroke detection unit that detects the rotation angle by which the rotation member has rotated from the reference position based on the magnetic force of the magnet rotating integrally with the rotation member, at least a portion of the stroke detection unit is disposed at a position where the portion overlaps with the magnet when viewed in the axial direction of the rotational axis of the rotation member, such that at least the portion of the stroke detection unit faces the magnet. As a result, it is possible to appropriately detect the rotation angle of the rotation member based on a change in the magnetic force due to a change in the magnetic flux direction of the magnet. Then, since the switch detection unit is disposed on the same substrate as the stroke detection unit, the switch detection unit may detect the magnetic force of the magnet in the vicinity of the stroke detection unit and may determine whether or not the rotation member has rotated from the reference position by a predetermined angle or more. Therefore, it is possible to simplify the positional relationship between the stroke detection unit and the switch detection unit in the magnetic detection unit and the magnet.

In this way, it is possible to simplify the rotation angle detection device for the vehicle brake.

Another feature of the rotation angle detection device for the vehicle brake according to the aspect of this disclosure resides in that at least a portion of the switch detection unit is disposed at a position where the portion overlaps with the magnet when viewed in the axial direction.

According to the above configuration, at least a portion of the switch detection section is disposed at a position where the portion overlaps with the magnet when viewed in the axial direction, such that at least the portion of the switch detection unit faces the magnet. As a result, it is possible to appropriately detect the rotation angle by which the rotation member has rotated from the reference position based on a change in the magnetic force due to a change in the magnetic flux direction of the magnet.

Another feature of the rotation angle detection device for the vehicle brake according to the aspect of this disclosure resides in that the stroke detection unit and the switch detection unit are disposed on the rotational axis.

According to the above configuration, by disposing the stroke detection unit on the rotational axis of the rotation member, it is possible to reliably detect the rotation angle of the rotation member.

In addition, according to the above configuration, by disposing the switch detection unit on the rotational axis of the rotation member, it is possible to reliably detect that the rotation member has rotated from the reference position by the predetermined angle or more.

Another feature of the rotation angle detection device for the vehicle brake according to the aspect of this disclosure resides in that the switch detection unit is disposed at a position where the switch detection unit overlaps with the magnet when viewed in a radial direction of the rotation member.

According to the above configuration, since the switch detection unit is disposed at a position where the switch detection unit overlaps with the magnet when viewed in the radial direction of the rotation member, the switch detection unit may appropriately detect that the rotation member has rotated from the reference position by the predetermined angle or more based on a change in the magnetic force due to a change in the distance between the switch detection unit and a magnetic pole of the magnet.

Another feature of the rotation angle detection device for the vehicle brake according to the aspect of this disclosure resides in that the stroke detection unit includes two stroke magnetic detection sensors, the magnetic detection unit is connected to a stop lamp and a vehicle engine control unit, and the magnetic detection unit outputs signals of the two stroke magnetic detection sensors as separate analog signals through two signal lines, and outputs a signal detected by the switch detection unit as a signal to turn on the stop lamp.

According to the above configuration, since the magnetic detection unit may output the signals of the two stroke magnetic detection sensors as separate analog signals to the engine control unit (hereinafter sometimes simply referred to as an "ECU") through the two signal lines signals, the engine control unit may doubly (redundantly) acquire signals including information about the rotation angle detected by the stroke detection unit. The engine control unit may determine that an operation state of the rotation angle detection device (the magnetic detection unit) is normal by utilizing the doubly acquired signals (e.g., via comparison such as addition or differentiation). In other words, it is possible to improve the reliability of the rotation angle detection device with the simple configuration in which the stroke detection unit includes two stroke magnetic detection sensors.

In addition, according to the above configuration, the magnetic detection unit may directly output the signal detected by the switch detection unit as a signal to turn on the stop lamp. Therefore, irrespective of the operation state of the engine control unit, the rotation angle detection device may reliably turn on the stop lamp which is necessary for the safe driving of a vehicle, according to a brake operation. That is, it is possible to improve the safety of the vehicle equipped with the rotation angle detection device with the simple configuration in which the magnetic detection unit outputs the signal to turn on the stop lamp.

Another feature of the rotation angle detection device for the vehicle brake according to the aspect of this disclosure resides in that the magnetic detection unit is connected to a stop lamp and a vehicle engine control unit, and the magnetic detection unit outputs a signal of the stroke detection unit as a digital signal and outputs a signal detected by the switch detection unit as a signal to turn on the stop lamp.

According to the above configuration, since the magnetic detection unit may output the signal of the stroke detection unit to the engine control unit as a digital signal that does not easily deteriorate signal information compared to an analog signal, the engine control unit may reliably acquire a signal including information about the rotation angle detected by the stroke detection unit. That is, it is possible to improve the reliability of the rotation angle detection device with the simple configuration in which the magnetic detection unit outputs the signal of the stroke detection unit as a digital signal.

In addition, according to the above configuration, since the magnetic detection unit may output the signal of the stroke detection unit as a digital signal to the engine control unit, the magnetic detection unit may easily superimpose, as a digital signal, a signal separate from the signal of the stroke detection unit on a signal line that outputs the digital signal from the magnetic detection unit to the engine control unit. Therefore, it is possible to simplify the rotation angle detection device by reducing the number of signal lines between the magnetic detection unit and the engine control unit.

In addition, according to the above configuration, the magnetic detection unit may directly output the signal detected by the switch detection unit as a signal to turn on the stop lamp. Therefore, irrespective of the operation state of the engine control unit, the rotation angle detection device may reliably turn on the stop lamp which is necessary for the safe driving of the vehicle, according to a brake operation. That is, it is possible to improve the safety of the vehicle equipped with the rotation angle detection device with the simple configuration in which the magnetic detection unit outputs the signal to turn on the stop lamp.

Another feature of the rotation angle detection device for the vehicle brake according to the aspect of this disclosure resides in that the magnetic detection unit includes a fault detector configured to detect a fault of the stroke detection unit, and the magnetic detection unit superimposes the signal of the stroke detection unit on a signal including fault information detected by the fault detector and outputs the superimposed signal.

According to the above configuration, since the magnetic detection unit may detect a fault of the stroke detection unit using the fault detector, it is possible to improve the reliability of the rotation angle detection device. Then, the magnetic detection unit may superimpose a fault signal detected by the fault detector on the signal of the stroke detection unit as a digital signal and output the digital signal to the engine control unit. Therefore, the engine control unit may determine that the operation state of the rotation angle detection device (the magnetic detection unit) is normal without causing a complicated structure of the magnetic detection unit.

Another feature of the rotation angle detection device for the vehicle brake according to the aspect of this disclosure resides in that the magnetic detection unit operates by switching an operation state between an intermittent mode in which the magnetic detection unit intermittently operates when the magnetic detection unit is not receiving a wakeup signal from the engine control unit and a continuous mode in which the magnetic detection unit releases the intermittent mode and continuously operates when the magnetic detection unit is receiving the wakeup signal, in the intermittent mode, the magnetic detection unit causes the switch detection unit to intermittently operate and stops an operation of the stroke detection unit, in the continuous mode, the switch detection unit detects the rotation angle by which the rotation member has rotated from the reference position based on the magnetic force of the magnet, and in the continuous mode, the magnetic detection unit causes the switch detection unit and the stroke detection unit to operate together.

According to the above configuration, the magnetic detection unit operates in the intermittent mode in which the magnetic detection unit causes the switch detection unit to intermittently operate and stops an operation of the stroke detection unit when the magnetic detection unit is not receiving the wakeup signal from the engine control unit, that is, in a case where the engine control unit does not transmit the wakeup signal. As a result, it is possible to reduce the power consumption of the rotation angle detection device.

In addition, the case where the engine control unit does not transmit the wakeup signal may include, for example, a case where a driving operation of the vehicle is not permitted, such as a state where a vehicle engine key is in the off state.

In addition, according to the above configuration, the magnetic detection unit may operate in the continuous mode in which the magnetic detection unit causes the switch detection unit and the stroke detection unit to operate together when the magnetic detection unit is receiving the wakeup signal from the engine control unit.

In this continuous mode, since the switch detection unit detects the rotation angle by which the rotation member has rotated from the reference position based on the magnetic force of the magnet, the switch detection unit also substantially functions as the stroke detection unit.

Therefore, the engine control unit may doubly acquire information about the rotation angle detected by the stroke detection unit and the switch detection unit, as necessary. Thus, the engine control unit may determine that the operation state of the rotation angle detection device (the magnetic detection unit) is normal.

In addition, in a case where the magnetic detection unit includes the fault detector, the magnetic detection unit may cause the fault detector to compare pieces of information about the rotation angle detected by the stroke detection unit and the switch detection unit, respectively, and may detect that the stroke detection unit (at least one of the stroke detection unit or the switch detection unit) is faulty when the pieces of information are different to some extent.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A rotation angle detection device for a vehicle brake, the rotation angle detection device comprising:
    a housing configured to accommodate a magnetic detection unit that detects a change in a magnetic force;
    a rotation member supported so as to be rotatable relative to the housing; and
    a magnet held by the rotation member and configured to rotate integrally with the rotation member,
    wherein the magnetic detection unit includes a stroke detection unit disposed on a substrate and a switch detection unit disposed on the substrate,
    the stroke detection unit detects a rotation angle by which the rotation member has rotated from a reference position based on a magnetic force of the magnet,
    the switch detection unit detects that the rotation member has rotated from the reference position by a predetermined angle or more,
    at least a portion of the stroke detection unit is disposed at a position where the portion overlaps with the magnet when viewed in an axial direction of a rotational axis of the rotation member, and
    the magnetic detection unit operates by switching an operation state between an intermittent mode in which the magnetic detection unit intermittently operates when the magnetic detection unit is not receiving a wakeup signal from an engine control unit connected to the magnetic detection unit and a continuous mode in which the magnetic detection unit releases the intermittent mode and continuously operates when the magnetic detection unit is receiving the wakeup signal.

2. The rotation angle detection device according to claim 1,
    wherein at least a portion of the switch detection unit is disposed at a position where the portion overlaps with the magnet when viewed in the axial direction.

3. The device according to claim 2,
    wherein the stroke detection unit and the switch detection unit are disposed on the rotational axis.

4. The device according to claim 1,
    wherein the switch detection unit is disposed at a position where the switch detection unit overlaps with the magnet when viewed in a radial direction of the rotation member.

5. The device according to claim 1,
    wherein the stroke detection unit includes two stroke magnetic detection sensors,
    the magnetic detection unit is connected to a stop lamp and the vehicle engine control unit, and
    the magnetic detection unit outputs signals of the two stroke magnetic detection sensors as separate analog signals through two signal lines, and outputs a signal detected by the switch detection unit as a signal to turn on the stop lamp.

6. The device according to claim 1,
    wherein the magnetic detection unit is connected to a stop lamp and the vehicle engine control unit, and
    the magnetic detection unit outputs a signal of the stroke detection unit as a digital signal and outputs a signal detected by the switch detection unit as a signal to turn on the stop lamp.

7. The device according to claim 6,
    wherein the magnetic detection unit includes a fault detector configured to detect a fault of the stroke detection unit, and
    the magnetic detection unit superimposes the signal of the stroke detection unit on a signal including fault information detected by the fault detector and outputs the superimposed signal.

8. The device according to claim 6,
    wherein in the intermittent mode, the magnetic detection unit causes the switch detection unit to intermittently operate and stops an operation of the stroke detection unit,
    in the continuous mode, the switch detection unit detects the rotation angle by which the rotation member has rotated from the reference position based on the magnetic force of the magnet, and
    in the continuous mode, the magnetic detection unit causes the switch detection unit and the stroke detection unit to operate together.

* * * * *